United States Patent
Porter et al.

[11] Patent Number: 6,098,412
[45] Date of Patent: Aug. 8, 2000

[54] METHOD FOR AUTOMATED DETECTION OF LEAKS IN A DISCHARGE CHECK VALVE

[75] Inventors: Kevin J. Porter, Syracuse; Garret J. Malone, E. Syracuse, both of N.Y.

[73] Assignee: Carrier Corporation, Syracuse, N.Y.

[21] Appl. No.: 09/234,029

[22] Filed: Jan. 19, 1999

[51] Int. Cl.[7] .................................................. F25B 49/02
[52] U.S. Cl. .............................................. 62/126; 62/129
[58] Field of Search ............................ 62/125, 126, 127, 62/129, 157, 158, 231

[56] References Cited

U.S. PATENT DOCUMENTS

| | | | |
|---|---|---|---|
| 4,862,698 | 9/1989 | Morgan et al. | 62/125 X |
| 5,140,825 | 8/1992 | Hanson et al. | 62/89 |
| 5,172,561 | 12/1992 | Hanson et al. | 62/127 |
| 5,186,014 | 2/1993 | Runk | 62/129 |
| 5,560,213 | 10/1996 | Wieszt | 62/129 X |
| 5,713,213 | 2/1998 | Nobuta et al. | 62/126 |

*Primary Examiner*—Harry B. Tanner
*Attorney, Agent, or Firm*—Wall Marjama Bilinski & Burr

[57] ABSTRACT

A method is provided for determining whether leaks are present in a discharge check valve of a refrigeration system. The method includes steps of establishing a pressure difference between a high pressure side and a low pressure side of the refrigeration system, temporarily stopping compression of a refrigerant, allowing the refrigerant to flow to the low-pressure sides, and then determining the discharge pressure changes with time.

11 Claims, 5 Drawing Sheets

METHOD FOR AUTOMATED DETECTION OF LEAKS IN A DISCHARGE CHECK VALVE

FIELD OF INVENTION

The present invention relates to refrigeration systems for heating and cooling in a controlled environment, and in particular to a pretrip routine for testing a refrigeration system. More specifically, the invention relates to a test for determining if leaks are present in a discharge check valve of a refrigeration system.

BACKGROUND OF THE INVENTION

Refrigeration systems are used in many applications for heating and cooling a controlled environment, including homes, offices and cargo boxes of transport trucks, trains, ships or planes. Before operating a refrigeration system in a cooling or heat/defrost mode, it is desirable to determine whether the refrigeration system is in an operational condition. To determine if the refrigeration system is functioning properly, a diagnostic "pretrip" routine is executed to ensure proper operation. Pretrip is a process of testing a refrigeration system before a refrigeration system is prepared in a cooling or heating/defrost mode to ensure that the system will operate properly.

U.S. Pat. No. 5,172,561 discloses a pretrip operational method for automatically checking predetermined functions and the operating performance of a transport refrigeration unit. This system measures the (current draw from predetermined electrical components with a prime mover stationary, and compares the measured current draw of those components with an allowable range for the component. When the comparison step finds that the current draw for each component checked is in the associated allowable range, the actual speed of the internal combustion engine is determined, and compared to the actual speed of the internal combustion engine to determine if it is in an allowable range. This pretrip method employs temperature sensors which sense the temperatures of the return air, discharge air and ambient air. The system is then commanded to operate in a cooling mode, and the unit is checked for adequate cooling capacity as a function of the temperature values of the return air, discharge air, and ambient air. It is then determined if the transport refrigeration system is operating in the commanded heating mode by comparing the temperatures of the return air and discharge air. Operation of the modulation valve is determined by sensing the speed of the prime mover before and after closing of the modulation valve.

Although the pretrip routine of U.S. Pat. No. 5,172,561 attempts to verify whether the system will operate correctly, it suffers from numerous defects. For example, one disadvantage is that the pretrip routine executed is the same regardless of the desired box temperature or ambient temperature. This creates numerous problems especially when heating in warm ambients or cooling in cool ambients. Another flaw of this pretrip method is that it fails to determine the causes of specific problems within the refrigeration system, and fails to isolate particular problems within specific components of a refrigeration system.

SUMMARY OF THE INVENTION

To overcome one major deficiency of the prior art, the present invention relates to an algorithm for detection of leaks in the discharge check valve. In particular, the testing method of the present invention alerts the user to any leaks in the discharge check valve. By detecting leaks before loading cargo or starting the trip, the user is made aware of potential operational problems with the refrigeration system before they become a problem. More specifically, the present invention relates to a method of detecting a leak in a discharge check valve of a refrigeration system which is accomplished by establishing a pressure difference between two sides of a system, and determining whether that pressure difference changes with time.

According to the present invention, a method of determining whether there are leaks in a discharge check valve of a refrigeration system is provided. This method is carried out by: (a) creating a pressure difference between a high-pressure side and a low-pressure side of the refrigeration system, (b) stopping an engine, hence stopping a compressor, (c) temporarily unloading cylinder banks of a compressor and allowing the refrigerant to flow to the low pressure side thereby reducing discharge pressure, and (d) determining if discharge pressure changes with time.

According to one aspect of the invention, the step of increasing a pressure difference between a high-pressure side and a low-pressure side of the refrigeration system can be accomplished by isolating the high pressure side from the low pressure side, and then increasing a discharge pressure on the high side, thereby establishing a relatively lower suction pressure on the low pressure side. Preferably, this pressure difference will be increased above a predetermined pressure differential and so that the suction pressure is below a pre-determined value. For example, below 5 psig.

According to yet another aspect of the invention, the cylinder banks of the compressor are temporarily unloaded to allow the refrigerant to flow to the low pressure side. This step can be accomplished by unloading front and rear cylinder banks, waiting a predetermined time and then loading the front and rear cylinder banks. The cylinder banks are unloaded and reloaded via energizing and de-energizing the front and rear unloaders. In the preferred embodiment the pre-determined time is equal to 30 seconds.

According to another aspect of the invention, a control unit may determine if the discharge pressure changes with time by measuring a first discharge pressure, waiting a pre-determined time, measuring a second discharge pressure, and determining a difference between the first discharge pressure and the second discharge pressure. The preferred embodiment of the invention, includes the step of activating a first alarm indicating that the discharge check valve is leaking when the difference is greater than a pre-determined value. In addition, a second alarm can be activated if either of the first discharge pressure or the second discharge pressure is greater than a maximum allowable discharge pressure, and the first discharge pressure is substantially equal to the second discharge pressure.

Therefore, it is an object of the present invention to overcome the limitations of the prior art.

It is a further object of the present invention to provide a method for automatically detecting leaks in a discharge check valve before loading cargo or starting a trip.

It is an object of the present invention to improve performance and reliability of the refrigeration system by detecting leaks in a discharge check valve.

It is yet a further object of the present invention to alert the user of potential problems with a refrigeration system before they adversely affect system performance.

Yet another object of the present invention is to use pressure measurements to determine if the system is operating correctly.

It is a further object of the present invention to alert the user if refrigerant is migrating backwards from the condenser into the compressor.

Yet, another object of the present invention is to prevent the compressor from filling up with refrigerant.

It is a further object of the present invention to establish a relatively large pressure difference between the discharge pressure and the suction pressure, and to then measure any subsequent changes in the discharge pressure with time.

It is a further object of the present invention to prevent unnecessary shut down of the system by detecting leaks before the system is operational and detrimentally relied upon.

Another object of the present invention is to ensure correct operation by picking up actual problems with the system, and to prevent false failures (i.e., false alarms) of the refrigeration system.

It is a further object of the present invention to alert the user to the actual problems in the system, and to avoid false failures.

It is yet a further object of the present invention to prevent shutdown of a refrigeration unit.

These and other features of the invention, as well as additional objects, advantages, and other novel features of the intention, will become apparent to those skilled in the art upon reading the following detailed description and accompanying drawings.

In order that the present invention may be more readily understood, the following description is given, merely by way of example, reference being made to the accompanying drawings.

DETAILED DESCRIPTION OF THE INVENTION

Figure 1:
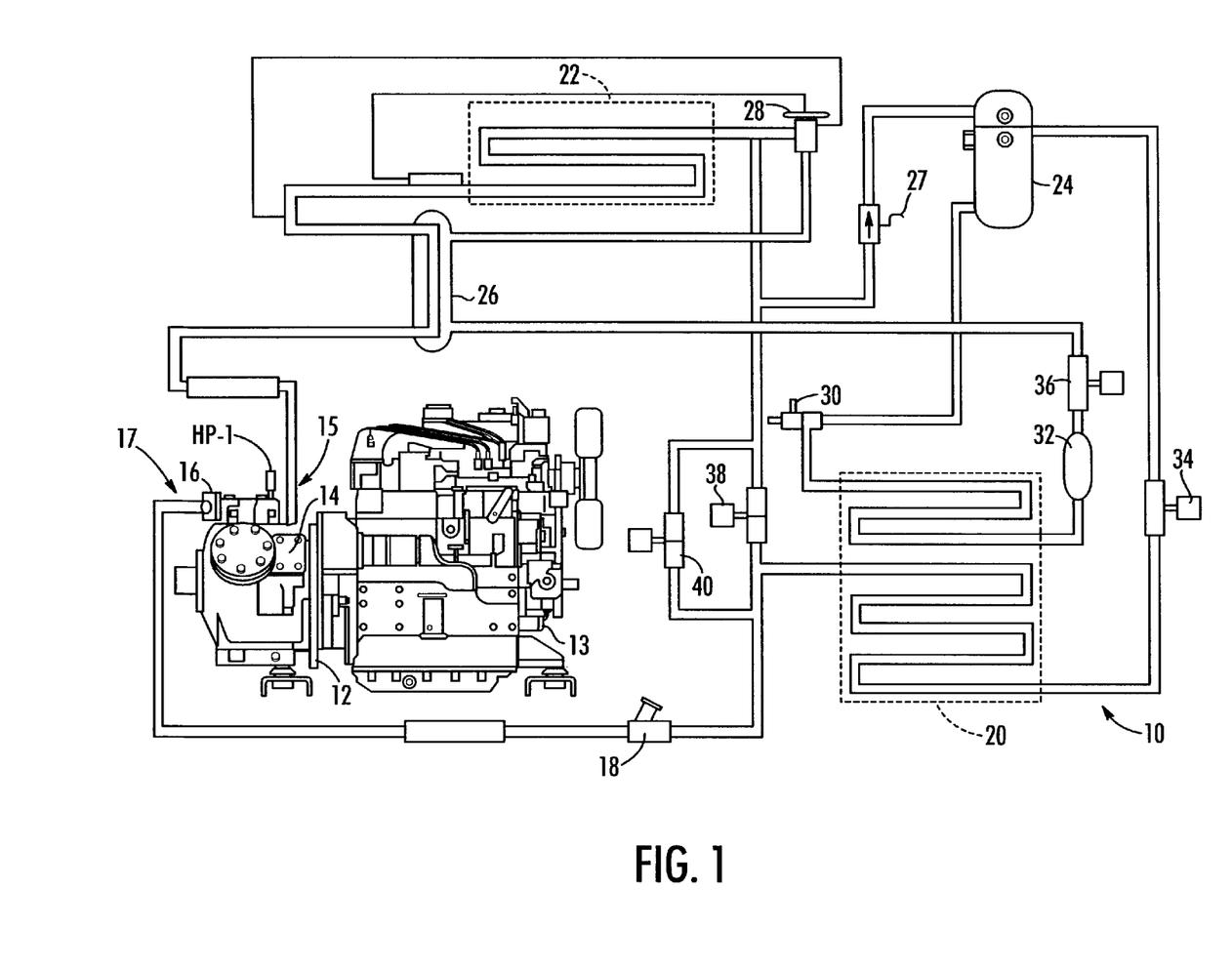
FIG. 1, is a schematic diagram of a refrigeration system.

One particular example of a refrigeration system in which the present invention may be employed is shown in FIG. 1. Refrigeration system 10 includes a compressor 12 driven by an engine 13, a suction service valve 14, a discharge service valve 16, a discharge check valve 18, an air cooled condenser 20 which includes a subcooler portion, an evaporator 22, a receiver 24, a heat exchanger 26, a bypass check valve 27, an expansion valve 28, a manual receiver shutoff valve 30, a filter drier 32, a plurality of valves 34, 36, 38, 40 (typically provided by solenoid valves), a front and rear unloader (not shown), a speed control solenoid 45 (FIG. 2), and an evaporator fan clutch (not shown). Compressor 12 includes a discharge or "high" side 15 and a suction, or "low" side 17. By convention, components of system 10 located toward high side 15 including discharge check valve 18 and condenser 20 are termed "high side" system components whereas system components located toward low side 15 including evaporator 22 and expansion valve 28 are termed "low side" system components. Furthermore, the region of system 10 between discharge side 15 and condenser 20 is conveniently referred to as the "high side" or "high pressure side" of system 10, while the region of system between condenser 20 and suction side 17 is conveniently referred to as the "low side" or "low pressure side" of system 10. Because valves 34–40 all operate to control the flow of refrigerant between high and low side system components, they are sometimes referred to herein as high to low side valves. The refrigeration system 10 operates in various modes, including a cooling mode and a heating/defrost mode. In the cooling mode, the refrigeration system 10 removes heat from a work space. In the heating mode, the refrigeration system 10 adds heat to the work space. In the defrosting mode, the refrigeration system adds energy to the evaporator, where the evaporator fan clutch is off, thus defrosting the evaporator.

Preliminarily, note that any known refrigerant may be used in the system, and that all references made to gas or liquid herein are actually referring to the state of the refrigerant at different places during operation. Generally, the purpose of the refrigerant is to pick up heat by evaporating at low pressure and temperature, and to give up heat by condensing at high temperature and pressure. For instance, by manipulating the pressure of the refrigerant to appropriate levels, the same refrigerant can evaporate at 40 degrees F. and condense at 120 degrees F. By evaporating at a low temperature, heat will flow from the work space into the refrigerant within the direct expansion evaporator 22. Conversely, the refrigerant rejects heat when it condenses from a gas into a liquid. This process is explained in greater detail below.

Operation of the refrigeration system 10 in a cooling mode of operation or a cooling cycle is as follows. In general, during the cooling cycle the evaporator 22 draws heat from the work space being cooled, whereas the condenser 20 is used to reject heat from the high pressure gas to the external environment.

To initiate a cooling cycle, a reciprocating compressor 12 receives low pressure refrigerant in the form of super-heated gas through a suction service valve 14 and compresses the gas to produce a high-pressure, super-heated gas. By reducing the volume of the gas, the compressor 12 establishes a high saturation temperature which enables heat to flow out of the condenser. The high pressure gas is discharged from the compressor 12 through a discharge service valve 16 and flows through a discharge check valve 18 into the condenser 20.

Next, a fan in the condenser 20 circulates surrounding air over the outside of condenser tubes comprising the coil. This coil is where the condensation takes place, and heat is transferred from the refrigerant gas to the air. By cooling the gas as it passes through the condenser 20, the removal of heat causes the gas to change state into a high-pressure saturated liquid. The refrigerant leaves the condenser as a high-pressure saturated liquid, and flows through valve 34, conveniently referred to as "condenser valve", into the receiver 24. As is shown in FIG. 1, valves 38 and 40, conveniently referred to as "hot gas valves", are closed thereby keeping the discharged gas from entering into a direct expansion evaporator 22.

From the air-cooled condenser 20, the high-pressure liquid then passes through open condenser valve 34

(sometimes referred to herein as condenser pressure control valve 34) and into a receiver 24. The receiver 24 stores the additional charge necessary for low ambient operation in a heating mode. The receiver 24 is equipped with a fusible plug which melts if the refrigerant temperature is abnormally high and releases the refrigerant charge. At the receiver 24, any gas remaining in the high-pressure liquid is separated and the liquid refrigerant then passes back through the manual receiver shutoff valve 30 (king valve) and into a subcooler section of the condenser 20 where it is subcooled. The subcooler occupies a portion of the main condensing coil surface and gives off further heat to the passing air. After being subcooled the liquid then flows through the filter-drier 32 where an absorbent keeps the refrigerant clean and dry. The high-pressure liquid then passes through the electrically controlled valve 36, conveniently referred to as "liquid line valve", which starts or stops the flow of refrigerant. In addition, the high-pressure liquid may flow to a heat exchanger 26. If so, the liquid is cooled even further by giving off some of its heat to the suction gas.

Next, the cooled liquid emerging from the heat exchanger 26 passes through an externally equalized thermostatic expansion valve 28. As the liquid is metered through the valve 28, the pressure of the liquid drops, thus allowing maximum use of the evaporator heat transfer surface. More specifically, this expansion valve 28 takes the subcooled liquid, and drops the pressure and temperature of the liquid to regulate flow to the direct expansion evaporator 22. This results in a low pressure saturated liquid/gas mixture.

After passing through the expansion valve 28, the liquid enters the direct expansion evaporator 22 and draws heat from the work space being cooled. The low pressure, low temperature fluid that flows into the evaporator tubes is colder than the air that is circulated over the evaporator tubes by the evaporator fan. As a result, heat is removed from the air circulated over the evaporator 22. That is, heat from the work space is transferred to the low pressure liquid thereby causing the liquid to vaporize into a low-pressure gas, thus, and the heat content of the air flowing over the evaporator 22 is reduced. Thus, the work space experiences a net cooling effect, as colder air is circulated throughout the work space to maintain the desired temperature. Optionally, the low-pressure gas may pass through the "suction line/liquid line" heat exchanger 26 where it absorbs even more heat from the high pressure/high temperature liquid and then returns to the compressor 12.

After passing through the heat exchanger 26, the gas enters the compressor 12 through the suction service valve 14 where the process repeats itself. That is, the air cooled by the evaporator 22 is sent directly to the air conditioned work space to absorb more heat and to bring it back to the coil for further cooling.

The refrigeration system of the present invention may also be used to heat the work space or defrost the evaporator 22. During the heating/defrost cycle, a low pressure vapor is compressed into a high pressure vapor, by transferring mechanical energy from a reciprocating compressor 12 to the gas refrigerant as it is being compressed. This energy is referred to as the "heat of compression", and is used as the source of heat during the heating/defrost cycle. This refrigeration system is known as a "hot gas heat" type refrigeration system since the hot gas from the compressor is used as the heat source for the evaporator. By contrast, the present invention could also be employed with heat pumps wherein the cycle is reversed such that the heat normally rejected to the ambient air is rejected into the work space. The heating/defrost cycle will now be described in detail.

In the heating/defrost cycle, the reciprocating compressor 12 receives low pressure and low temperature gas through the suction service valve 14 and compresses the gas to produce a high pressure gas. The high temperature, high pressure gas is discharged from the compressor 12 through the discharge service valve 16. The hot gas valve 38 and the condenser pressure valve 34 are closed to prevent refrigerant from flowing through them. This closes off the condenser 20 so that once the condenser coils are substantially filled with refrigerant, the majority of the refrigerant will then flow through the discharge check valve 18 and the hot gas valve 40. The hot gas from the compressor 12 then flows into the evaporator 22, effectively transferring energy from the compressor to the evaporator and then to the work space.

A processor 100 opens valve 36 when the compressor discharge pressure falls to cut-in settings, allowing refrigerant from the receiver to enter the evaporator 22 through the expansion valve 28. The hot vapor flowing through valve 40 forces the liquid from the receiver 24 via a bypass check line and a bypass check valve 27. By opening valve 36 and closing valve 34, the refrigerant liquid is allowed to fill up and build up head pressure, equivalent to discharge pressure, in the condenser 20. Opening valve 36 also allows additional refrigerant to be metered through the expansion valve 28 so that it eventually is disposed in the condenser 20. The increase of the refrigerant in the condenser 20 causes the discharge pressure to rise, thereby increasing the heating capacity of the refrigeration system 10. This allows the compressor 12 to raise its suction pressure, which allows the refrigeration system 10 to heat. Liquid line valve 36 will remain open until the compressor discharge pressure increases to cut-out setting, at which point a processor 100 closes (shown in FIG. 2) solenoid valve 36. This stops the flow of refrigerant in the receiver 24 to the expansion valve 28. Significantly, valve 36 may be closed only after the compressor 12 is discharging at a cut-out pressure. Thus, via the evaporator 22, the high pressure refrigerant gas gives off heat to the work space, lowering the temperature of the refrigerant gas. The refrigerant gas then leaves the evaporator 22 and flows back to the compressor 12 through the suction service valve 14.

In a preferred embodiment, the hot gas valve 38 is closed if the ambient temperature is above a first predetermined temperature. If after a 60 second delay the engine remains in high speed, and the difference between ambient and discharge temperatures exceeds a pre-determined temperature differential, then valve 38 opens. On the other hand, if the difference between ambient and discharge temperatures goes below a second pre-determined temperature differential, then valve 38 closes. When in engine operation and the discharge pressure exceeds pre-determined pressure settings, pressure cutout switch (HP-1) opens to de-energize the run relay coil and stop the engine.

Figure 2:
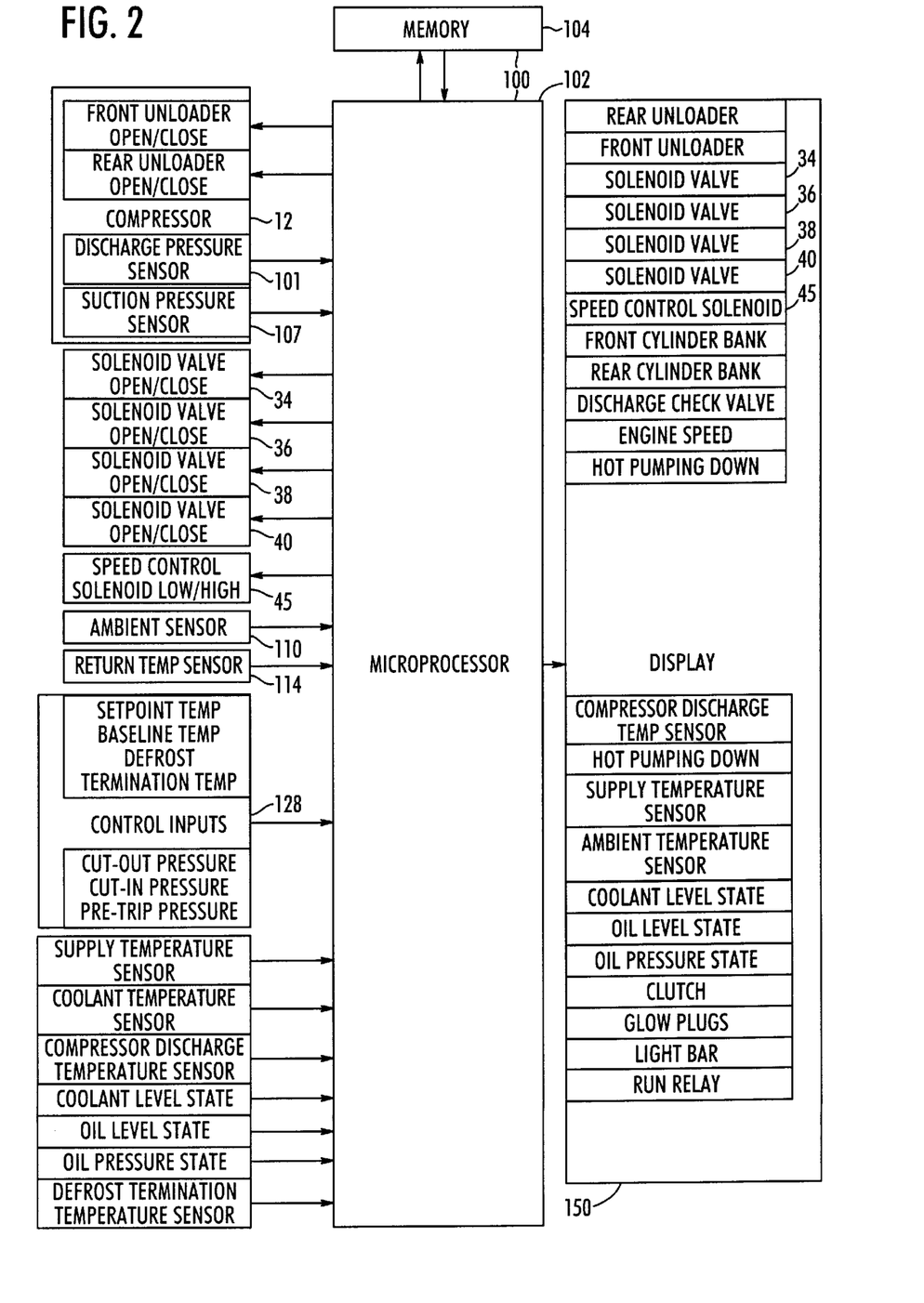
FIG. 2, is a block diagram of the control unit, according to the present invention.

Turning to FIG. 2, the refrigeration system 10 is electronically controlled by a control unit shown as being provided by a processor 100, including a microprocessor 102 and an associated memory 104. The processor 100 is connected to a display 150 which displays various parameters and also various fault alarms that exist within the refrigeration system 10.

When the refrigeration system 10 is in an operating mode to control the temperature of a work space, the processor 100 receives several inputs including an ambient temperature from an ambient temperature sensor 110, a setpoint temperature, a return temperature from a return temperature sensor 114, a baseline temperature, a suction pressure from a suction pressure transducer 107, a discharge pressure from a discharge pressure transducer 101, a cut-out pressure, a cut-in pressure and a pretrip pressure. The ambient temperature is received by the processor 100 through the ambient temperature sensor 110 on the exterior of the work space. The setpoint temperature is input to the processor 100 through an input control device 128 and is typically the desired temperature of the work space. The return temperature is the actual temperature of the work space and is received by the processor 100 through the return temperature sensor 114 located within the work space. The baseline temperature is input to the processor 100 through the input control device 128 and will be discussed later.

In addition, there are several other inputs to the processor 100 including a supply temperature, a coolant temperature, a compressor discharge temperature, a coolant level state, an oil level state, an oil pressure state, and a defrost termination temperature.

The suction pressure, sensed by the suction pressure transducer 107, is the pressure of the refrigerant vapor at the low side of the compressor 12 as it is being drawn into the compressor through the suction service valve 14. The suction pressure transducer 107 is disposed in a position to monitor the pressure through the suction service valve 14 and the suction pressure value is input to the processor 100, where the processor 100 uses the value or stores the value for later use.

The discharge pressure, sensed by the discharge pressure transducer 101, is the pressure at the high side of the compressor 12. This is the pressure of the refrigerant vapor as it is being discharged from the compressor 12 through the discharge service valve 16. The discharge pressure is monitored by a pressure transducer 101 disposed in a position to monitor the pressure through the discharge service valve 16 and the discharge pressure value is input to the processor 100, where the processor 100 uses the value or stores the value for later use.

At certain times during operation of refrigeration system 10 in an operational mode, such as a cooling, a heat/defrost mode, or a pretrip mode, it may be necessary to control an input to a system component based on a pressure differential indicator which indicates a pressure differential between different points in a refrigeration system such as between a high side and a low side of compressor 12. Because discharge pressure, suction pressure, and pressure differential normally predictably depend on one another, this pressure differential indicator can in general, be provided by any one of a discharge pressure reading, a suction pressure reading or pressure differential such as (discharge pressure minus suction pressure) reading or by a combination of such readings. Furthermore, because pressure is related to temperature, a pressure differential indicator can also normally be provided by a discharge temperature reading, a suction temperature reading, or temperature differential such as (discharge temperature minus suction air temperature) reading or by a combination of such readings. Under certain circumstances, however, such as where the refrigerant is subjected to temperature sensing in a vapor-only phase, a temperature transducer may not provide as reliable an indicator as pressure as a pressure transducer.

The cut-out pressure, cut-in pressure and pretrip pressure are user selected pressure values that are input to the processor 100 through the input control device 128 and will be discussed below.

The processor 100 determines whether to operate refrigeration system 10 in a cooling mode or heating mode by comparing the setpoint temperature to the supply and/or return temperature. If the setpoint temperature is less than the return temperature, then processor 100 operates the refrigeration system 10 in a cooling mode. If the setpoint temperature is greater than the return temperature, then processor 100 operates refrigeration system 10 in a heating mode.

In the cooling mode, the processor 100 opens and closes high-to-low side valves 34–40 according to a required protocol as described previously herein in connection with FIG. 1. In particular, the processor 100 opens valves 34 and 36 and closes valves 38 and 40, which forces the refrigerant to flow from the compressor 12 to the condenser 20, through the condenser 20 and to the receiver 24, through the receiver 24 and back to the condenser 20, through the condenser 20 and to the heat exchanger 26, through the heat exchanger 26 and through the expansion valve 28 and then to the evaporator 22, through the evaporator 22 and back through the heat exchanger 26, and then back to the compressor 12. The details of the cooling mode have been discussed above.

In the heating mode, the processor 100 opens and closes high-to-low side valves 34–40 according to a required protocol and as described previously according to FIG. 1. In particular, the processor 100 closes condenser valve 34 and opens hot gas valve 40, which causes the condenser 20 to fill with refrigerant, and forces the hot gas from the compressor 12 into the evaporator 22. The liquid line valve 36 remains open until the discharge pressure reaches the cut-out pressure, at which point the processor 100 de-energizes and closes the liquid line valve 36 thereby stopping the flow of refrigerant into the expansion valve 28. When the compressor discharge pressure falls to the cutin pressure, the processor 100 in turn energizes the closed liquid line valve 36 which opens, allowing refrigerant from the receiver 24 to enter the evaporator 22 through the expansion valve 28. Typically, in the heating mode, valve 38 remains closed until the compressor discharge temperature rises by a predetermined amount at which point valve 38 opens. The details of the heating mode have been discussed above. From time to time, the refrigeration system 10 will be caused to cease operating in a cooling or heating/defrost mode. For example, refrigeration system 10 is employed to control the air temperature of a tractor trailer work space (known as a "box") it is typical to take the refrigeration system 10 out of a cooling or heating/defrost mode when a door of the trailer is opened for loading or unloading goods from the box. Before starting up the refrigeration system 10, or restarting the system 10 after a temporary shutdown, it is sometimes desirable to have the processor 100 execute a routine in order to determine the operational condition of various components of the refrigeration system 10. Because such a routine is useful in determining component problems which may cause the refrigeration system 10 to malfunction when placed on line (that is, caused to operate in a cooling or heat/defrost mode), such a routine may be referred to as a "pretrip" routine.

Preferably, the pre-trip routine comprises several tests for determining the mechanical operation of each of several system components such as high-to-low side valves 34, 36, 38, 40, the discharge check valve 18, a front unloader, a rear unloader, a front cylinder bank and a rear cylinder bank (not shown) of the compressor 12.

Now referring to particular aspects of the present invention, the present invention relates to a method for testing a discharge check valve of a refrigeration system. Testing of a discharge check valve is important because a properly working discharge check valve 18 stops refrigerant from migrating backwards into the compressor 12 from the condenser 20. A leak in the discharge check valve 18 will allow the compressor 12 to fill up with fluid, flood the compressor, and shut down the unit.

To address this problem, the present invention provides a method for detection of leaks in the discharge check valve 18. The method according to the present invention is described with reference to the flow diagram of FIG. 3. According to the method, processor at block 200, first establishes a pressure difference between a high (discharge pressure) and low side (suction pressure) of a refrigeration system. Then at block 201 the processor temporarily ceases compressing refrigerant, typically by turning off the compressor 12. Finally after temporarily ceasing compression, the processor 100, at block 202, detects for leaks in check valve 18, by measuring a change in discharge pressure with time. As shown at block 204, if the discharge pressure remains substantially constant for a substantial period of time, then it is determined that no leaks are present and that the discharge check valve 18 is working properly. However, if the discharge pressure rises substantially during the same time period, then as shown at block 206, the processor 100 alerts the user that the discharge check valve 18 is allowing refrigerant to migrate backwards from the condenser 20 into the compressor 12. This testing method will now be described in detail.

Figure 3:
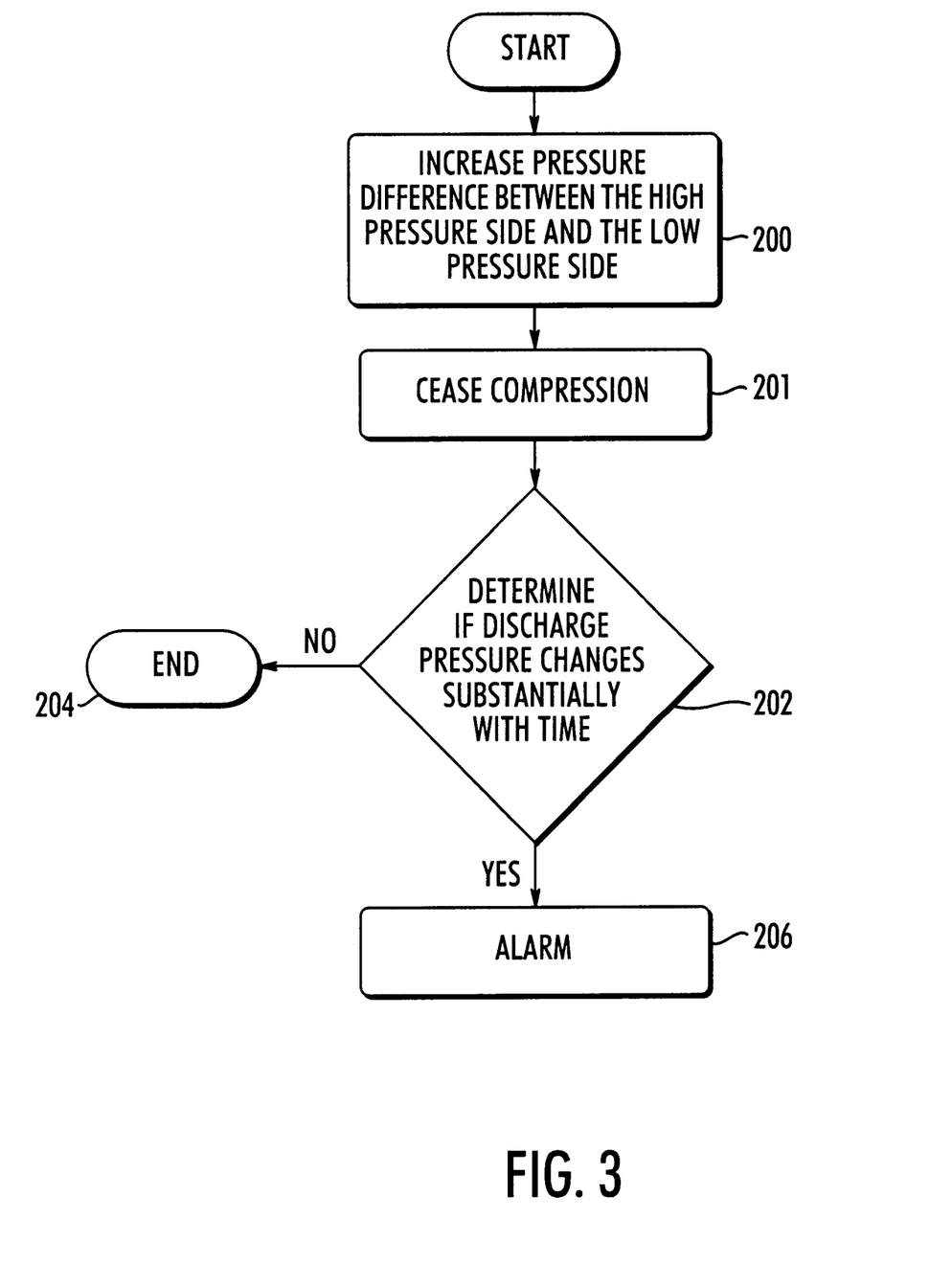
FIG. 3, is a flow diagram illustrating operation of a method for detecting leaks in discharge check valve, according to the present invention.

Establishing a pressure differential, as indicated at block 200 of FIG. 3, improves the detection process for leaks in the check valve 18 since a relatively large force is needed to push an adequate amount of refrigerant through a leak if one exists. Low suction pressure is also necessary to ensure that a substantial amount of refrigerant has been removed from the evaporator. In this system a discharge pressure transducer 101 measures the compressor discharge pressure.

Processor 100 may increase a pressure difference, as indicated by block 200 of FIG. 3, by isolating the high-pressure side of the system from the low-pressure side of the system. In the preferred embodiment, this step is accomplished by closing all high-to-low side valves 34–40 which connect the high-pressure side to the low-pressure side of system 10, while continuing to operate compressor 12 in at least low capacity.

Figure 4:
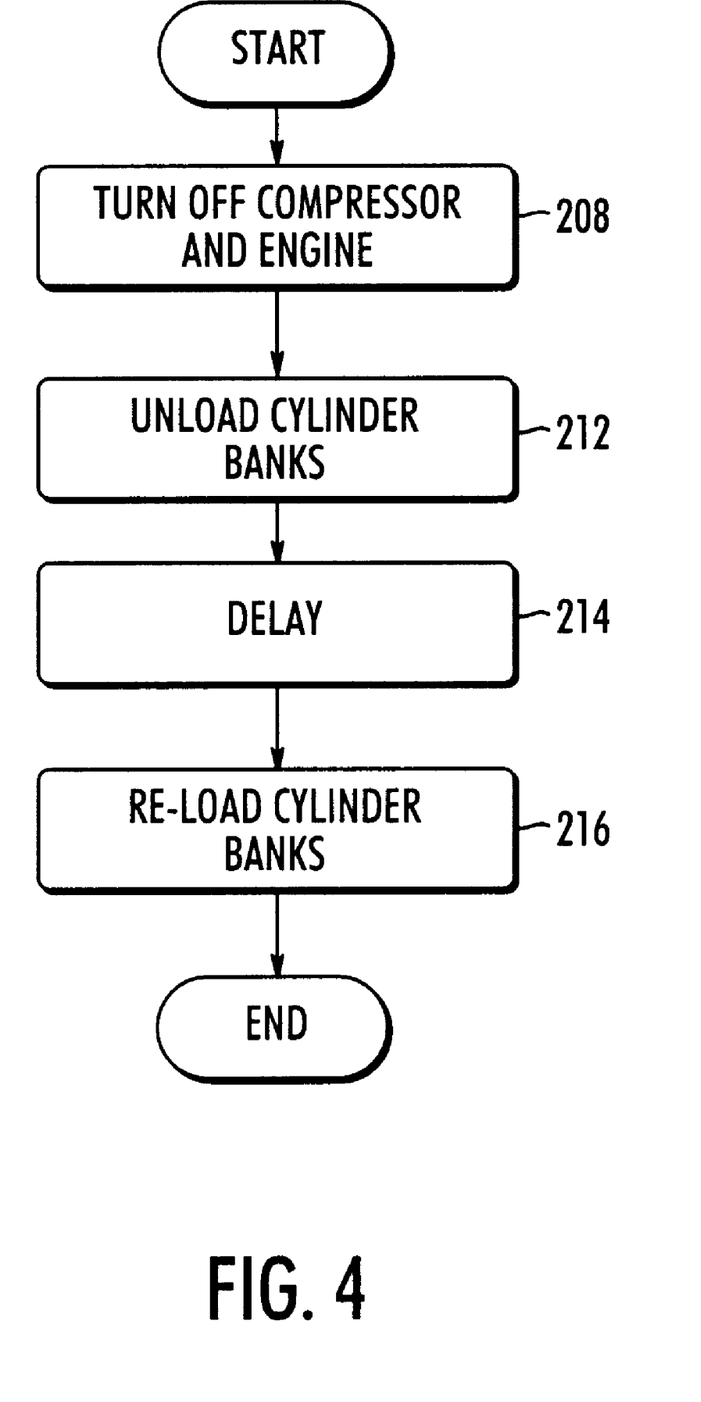
FIG. 4, is a flow diagram of the method of allowing the discharge pressure to drop as refrigerant in the discharge line flows through bleed ports, according to the present invention.

With reference to further aspects of the invention, as indicated by block 201, of FIG. 3, processor 100 may temporarily cease compressing a refrigerant. A particular method by which this is done is described with reference to flow diagram or FIG. 4. As indicated by block 208, processor 100 temporarily stops compressing refrigerant by first turning off the compressor 12. Then, at block 212, the processor 100 energizes the front and rear unloaders for a pre-determined time. Energizing the unloaders unloads the front and rear cylinder banks, causing vapor from the high pressure side of the compressor to discharge or bleed through the unloader bleed ports to the low pressure side. This causes the pressure between the discharge check valve 18 and the compressor 12 to drop dramatically. Next, after waiting a predetermined time (preferably 30 seconds) 214, the processor 100 deenergizes the front and rear unloaders to reload the front and rear cylinders 216, causing the bleed ports of the unloaders to close. This stops the vapor from leaking through the bleed ports.

Assuming the discharge check valve 18 is working properly, the discharge check valve 18 will prevent the refrigerant's natural tendency of flowing from the condenser 20 into the compressor 12. By unloading the cylinder banks, vapor will "bleed" or escape from the compressor 12. This "bleeding" will cause the pressure within the compressor 12 to drop. Even without bleeding the vapor from the compressor 12, cooling will cause the pressure in the system between the compressor 12 and discharge check valve 18 to be naturally lower than the pressure between the discharge check valve 18 and condenser. Thus, in either situation the pressure in the portion of discharge line between the compressor 12 and the discharge check valve 18 will be significantly lower than the pressure in the portion of the discharge line between discharge check valve 18 and the condenser 20. Consequently, if there are any leaks in the discharge check valve 18, the pressure between the discharge check valve 18 and compressor 12 will increase over time as refrigerant leaks through the discharge check valve 18. Accordingly, processor 100 tests for changes in discharge pressure as is indicated by block 202 of FIG. 3 in the manner described with reference to the flow diagram of FIG. 5. With referenced to FIG. 5, processor 100 detects changes in discharge pressure by first reading a first discharge pressure at block 218 and stores the value as DP1. After a predetermined delay (preferably 10 seconds) indicated by block 220, the processor 100 at block 222 reads the discharge pressure again and stores the value as DP2. A time delay is normally necessary in order to allow system pressures to stabilize. The processor 100 then determines the difference between DP2 and DP1, and if this difference is greater than a predetermined discharge pressure difference (preferably 15 psig), then it is determined that gas has leaked from the condenser into the compressor. Processor 100 at block 226, then sounds an alarm which indicates that the discharge check valve 18 is leaking. Otherwise, as shown in block 204, when the processor 100 determines that the difference is less than the pre-determined discharge pressure difference 224, then processor 100 determines that there are no significant leaks present in the discharge check valve 18, and exits the test routine at block 228.

Figure 5:
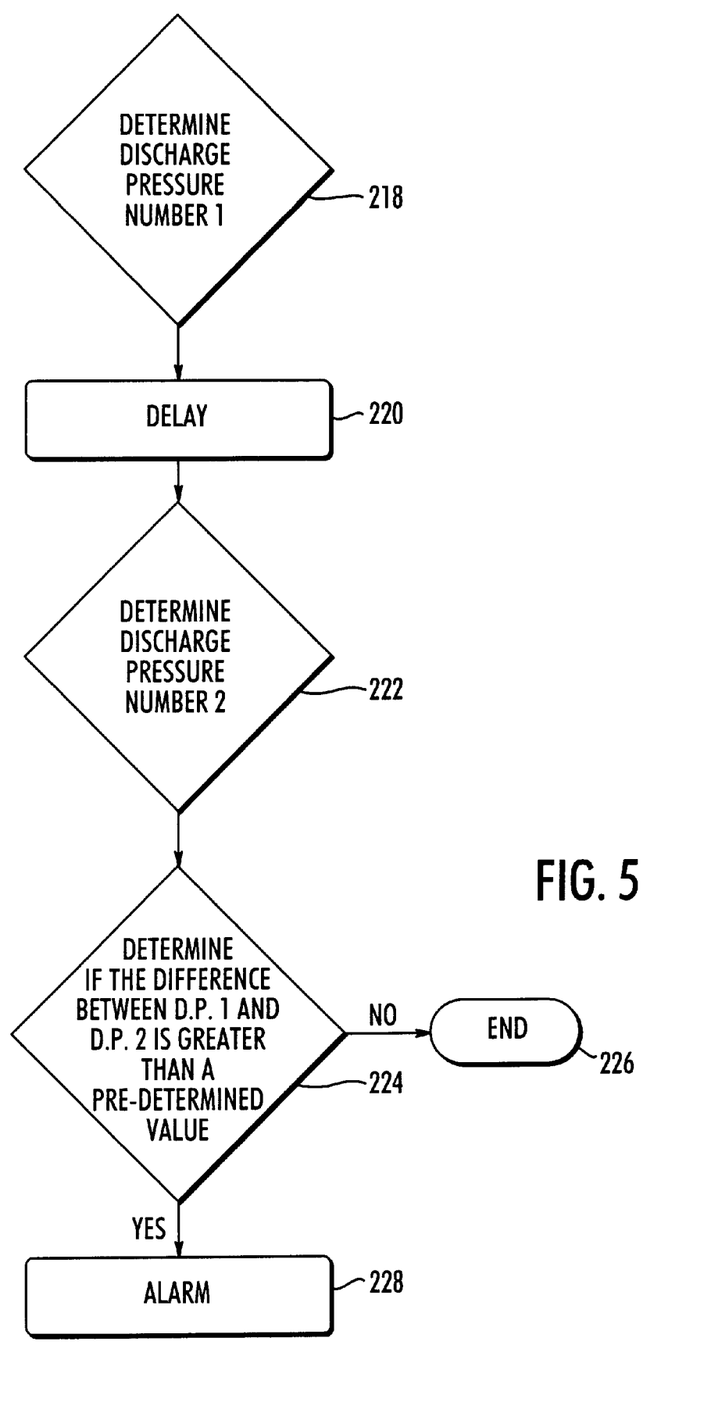
FIG. 5, is a flow diagram of the method of determining whether the discharge pressure changes significantly with time, according to the present invention.

In a preferred embodiment, the processor 100 may determine whether the discharge check valve 18 is experiencing a major leak by performing an additional test. This method of testing for a major leak will be explained hereinbelow. In the case of a major leak (i.e. complete failure of the valve), the normal test may fail to detect a leak because the discharge pressures before and after the delay may be substantially the same. Therefore, the difference in discharge pressure at different times may not exceed a predetermined value. As a result, the normal test would indicate that no leak is present, when in fact, a major leak is present. Thus, to detect a major leak, the processor 100 may be caused to execute an additional test if processor 100 determines that the difference in discharge pressure at different times (DP2−DP1) is approximately zero. If the processor determines that (DP2−DP1) is approximately zero, processor 100 may then check to determine if either DP1 or DP2 is in excess a predetermined discharge pressure. If the valve 18 has failed completely, the discharge pressure will remain at a high value even after the compressor is shut off. Consequently, if either DP1 or DP2 is greater than a predetermined discharge pressure after the compressor is turned off, then the processor 100 will sound an alarm to indicate a major leak in the discharge check valve 18.

Processor 100 may implement this testing method of the invention as a test of a larger pretrip routine algorithm. The processor 100 may administer the test described herein immediately before or subsequent to administering another test for testing other system components. Alternatively, the processor 100 may administer the test of the present invention independent of administering other component tests. Methods related to the present invention for testing various refrigeration system components and for executing pretrip routines for testing and refrigeration systems are described in detail in related Application Serial No. 09/234,041, filed concurrently herewith, entitled "Pretrip Device for Testing of a Refrigeration System Compressor", Application Serial No. 09/234,037, filed concurrently herewith, entitled "Pretrip Routine Comprising Tests of Individual Refrigeration System Components", Application Serial No. 09/233,775, filed concurrently herewith, entitled "Control Algorithm for Maintenance of Discharge Pressure", Application Serial No. 09/233.770 filed concurrently herewith, entitled "Test for the Automated Detection of Leaks Between High and Low Pressure Sides of a Refrigeration System", and Application Serial No. 09/234.032 filed concurrently herewith, entitled "Adaptive Pretrip Selection" each assigned to the same assignee of the present invention, and each of which is incorporated herein by reference in its entirety.

While the present invention has been particularly shown and described with reference to the preferred mode as illustrated in the drawings, it will be understood by one skilled in the art that various changes in detail may be effected therein without departing from the spirit and scope of the invention as defined by the claims.

We claim:

1. A method of determining whether leaks are present in a discharge check valve of a refrigeration system, comprising:
    a.) establishing a pressure difference between a high-pressure side and a low-pressure side of said refrigeration system;
    b.) temporarily stopping compression of a refrigerant, and allowing said refrigerant to flow to said low-pressure side; and
    c.) determining if discharge pressure changes with time.

2. A method of determining whether leaks are present in a discharge check valve of a refrigerator system, as recited in claim 1, wherein step c.) comprises:
    measuring a first discharge pressure;
    waiting a predetermined time;
    measuring a second discharge pressure; and
    determining a difference between said first discharge pressure and said second discharge pressure.

3. A method of determining whether leaks are present in a discharge check valve of a refrigerator system, as recited in claim 2, further including the step of activating a first alarm indicating that said discharge check valve is leaking when said difference is greater than a pre-determined value.

4. A method of determining whether leaks are present in a discharge check valve of a refrigeration system, as recited in claim 2, further including the step of activating a second alarm if either of said first discharge pressure or said second discharge pressure is greater than a maximum allowable discharge pressure, and said first discharge pressure is substantially equal to said second discharge pressure.

5. A method of determining whether leaks are present in a discharge check valve of a refrigeration system, as recited in claim 2, wherein step b.) comprises:
    unloading front and rear cylinder banks;
    waiting a predetermined time; and
    loading said front and rear cylinder banks.

6. A method of determining whether leaks are present in a discharge check valve of a refrigeration system, as recited in claim 5, wherein step a.) comprises:
    isolating said high pressure side from said low pressure side; and
    increasing a discharge pressure on said high side, thereby establishing a low suction pressure on said low pressure side, and a high discharge pressure of said high pressure side.

7. A method of determining whether leaks are present in a discharge check valve of a refrigeration system, as recited in claim 6, wherein a difference between said low suction pressure and said high discharge pressure is greater than a pre-determined pressure differential.

8. A method of determining whether leaks are present in a discharge check valve of a refrigeration system, as recited in claim 7, wherein said discharge pressure is continually increased until said low suction pressure is below a pre-determined value.

9. A method of determining whether leaks are present in a discharge check valve of a refrigeration system, as recited in claim 8, wherein said suction pressure is below 5 psig.

10. A method of determining whether leaks are present in a discharge check valve of a refrigeration system, as recited in claim 8, wherein said low suction pressure is below a workspace saturation pressure.

11. A method of determining whether leaks are present in a discharge check valve of a refrigeration system, as recited in claim 6, wherein said step of isolating is accomplished by closing all valves which connect the high pressure side to the low pressure side.

* * * * *